(12) United States Patent  
Sato (10) Patent No.: US 6,609,670 B2
(45) Date of Patent: Aug. 26, 2003

(54) SPINNING REEL ROTOR BRAKING DEVICE (75) Inventor: Jun Sato, Sakai (JP)

(73) Assignee: Shimano Inc., Osaka (JP)

( * ) Notice: Subject to any disclaimer, the term of this patent is extended or adjusted under 35 U.S.C. 154(b) by 211 days.

(21) Appl. No.: 09/879,971

(22) Filed: Jun. 14, 2001

(65) Prior Publication Data

US 2001/0054660 A1 Dec. 27, 2001

(30) Foreign Application Priority Data

Jun. 23, 2000 (JP) ...................................... 2000-189627
Aug. 9, 2000 (JP) ...................................... 2000-240809

(51) Int. Cl.$^7$ ............................................. A01K 89/01
(52) U.S. Cl. ...................................................... 242/231
(58) Field of Search ................................ 242/230, 231, 242/232, 157 R (56) References Cited

U.S. PATENT DOCUMENTS

| 3,045,942 | A |   | 7/1962  | Henze         |         |
|-----------|---|---|---------|---------------|---------|
| 3,627,223 | A |   | 12/1971 | Monthulet     |         |
| 4,095,400 | A |   | 6/1978  | Pownall       |         |
| 4,109,880 | A |   | 8/1978  | Yamasaki et al. |       |
| 4,238,085 | A | * | 12/1980 | Jansson et al. | 242/232 |
| 4,291,846 | A |   | 9/1981  | Carpenter     |         |
| 4,529,142 | A |   | 7/1985  | Yoshikawa     |         |
| 4,703,902 | A |   | 11/1987 | Prouza et al. |         |
| 5,524,832 | A |   | 6/1996  | Sakaguchi     |         |
| 5,683,049 | A |   | 11/1997 | Kawabe et al. |         |
| 5,820,051 | A |   | 10/1998 | Takeuchi et al. |       |
| 6,095,311 | A |   | 8/2000  | Henschel      |         |
| 6,371,395 | B2 | * | 4/2002 | Sato          | 242/232 |
| 6,382,542 | B1 |   | 5/2002 | Sato          |         |

FOREIGN PATENT DOCUMENTS

| DE | 195 22 835 A1 | 1/1997 |         |
|----|---------------|--------|---------|
| EP | 0 406 898 A1  | 1/1991 |         |
| EP | 0 467 812 A1  | 1/1992 |         |
| EP | 0 768 030 A1  | 4/1997 |         |
| FR | 1098685       | * 8/1955 | 242/232 |
| FR | 2 462 098 A1  | 2/1981 |         |

* cited by examiner

Primary Examiner—Emmanuel Marcelo
(74) Attorney, Agent, or Firm—Shinjyu Global IP Counselors, LLP (57) ABSTRACT Rotor braking device for stably braking the rotor in a spinning reel, regardless of fluctuations in the amount a shifting member of the device shifts, and for shifting the shifting member smoothly when contacting the rotor braking member. The rotor braking device (54b)—which is for braking the rotor (3), fitted rotatively to a spinning-reel reel unit (2), in response to pivoting of the bail arm (17) that pivots between line-winding and line-releasing postures—includes a braking member (65) and a shifting member (51). The elastic braking member (65) is provided on front of the reel unit facing the rotor, and includes, in at least a portion of its contour, a braking surface (65a) and a conducting surface (65b) arranged in continuation with the braking surface, extending frontward from the braking surface and gradually receding from the braking surface. The shifting member is disposed on the rotor and can be shifted in a direction perpendicular to a pressure direction of the braking member, such that when the bail arm pivots from the line-winding posture to the line-releasing posture, the shifting member contacts first the conducting surface and then the braking surface.

19 Claims, 8 Drawing Sheets

SPINNING REEL ROTOR BRAKING DEVICE

BACKGROUND OF THE INVENTION

1. Technical Field

The present invention relates to rotor braking devices; more particularly to spinning-reel rotor braking devices for braking the rotor, fitted rotatively to the spinning-reel reel body, in response to pivoting of the bail arm that pivots between line-winding and line-releasing postures.

2. Description of Related Art

In general spinning reel rotors are provided with a bail arm for guiding fishing line to the spool. The bail arm can assume a line-winding posture, in which fishing line is guided to the peripheral surface of the spool when fishing line is being taken up, and a line-releasing posture, in which the bail arm is flipped over from the line-winding posture so that it poses no hindrance when fishing line is rolled off the spool. The rotor is provided with a bail tripping device, which keeps the bail arm in the line-winding posture and the line-releasing posture, and restores the bail arm from the line-releasing posture to the line-winding posture when the rotor rotates in line-winding direction.

As a conventional bail tripping device, the device disclosed in JP H10-4839 is known. This bail tripping device includes: a toggle spring, mounted to the rotor, whose front end is interlocked with the bail arm in the vicinity of its pivotal center; a shifting member having a front end that interlocks with the bail arm in the vicinity of its pivotal center, and a base end that shifts back and forth with respect to the reel unit; and a switching protrusion provided on the reel unit for coming into contact with the shifting member. The toggle spring toggles and biases the bail arm into two positions, and keeps the bail arm in these two positions. The toggle spring includes a coil spring accommodated in a recess formed in the rotor arm of the rotor, and a linking member that is subject to the spring force of the coil spring. The linking member includes a shaft member against which the coil spring presses, and disposed at the tip of the shaft member, a link that is pivotable over a predetermined range. The tip of the link is interlocked with the bail arm near the pivot center of the bail arm.

The shifting member recedes to a position in which it contacts a switching protrusion when the bail arm is pivoted to the line-releasing posture. Then, when the rotor is rotated in the direction taking up line, it contacts the shifting protrusion and is advanced forward, thereby compressing the toggle spring, which returns the bail arm to the line-winding posture.

In a bail tripping device with this configuration, the shifting member recedes to a position in which it contacts the switching protrusion when the bail arm is pivoted into the line-releasing posture. In this situation, the shaft member recedes with respect to the toggle spring while the link pivots until the dead point is passed, and when the dead point is passed, the shaft member is urged forward by the coil spring. Then, when the rotor rotates in the line-winding direction, the shifting member contacts the switching protrusion and is advanced forward. Due to this forward advancement, the link pivots and the shaft member recedes until the dead point is passed. Then, when the dead point is passed, the link advances forward and restores the bail arm to the line-winding posture.

When fishing line is reeled out by casting a spinning reel thus, reverse rotation of the rotor is blocked; and after catching fishing line with the thick of the index finger, the bail arm is tripped into the line-releasing posture. At this time the rotor is turned to bring the line roller at the one junction of the bail arm and the bail up toward the fishing rod, to make it easy to catch fishing line with the finger. Then, in the course of flinging down the fishing rod, the index finger is released from fishing line, and the bait and terminal tackles' arrival on the water is awaited. After the bait and terminal tackles have hit the water and the bait and terminal tackles have submerged suitably, the handle is reeled slightly and the bail tripping mechanism returns the bail arm into the line-winding posture.

When fishing line reels out following a cast or under the weight of the bait and terminal tackles during trolling, an operation known as "feathering" is carried out to keep the line from getting out of control: After the bail arm has been tripped into the line-releasing posture, the leading rim of the spool is pressed with the tip of the index finger, and the thick of the index finger is brought into contact with fishing line. At the time, the rotor is turned into a position in which the bail arm does not get in the way.

In conventional spinning reels, when the bail arm is in the line-releasing posture and reverse rotation is blocked by a reverse rotation check mechanism, the rotor will not rotate in the direction rolling off line. However, sometimes the rotor is rotated in the line-winding direction. In recent years, rotors have become lighter and easier to turn, improving the rotational balance, in order to increase the winding efficiency. Therefore, such a spinning reel with improved rotational balance can be rotated easily in the line-winding direction. When the rotor is turned, the rotational orientation of the rotor tends to shift easily when the rotor has been rotated into the rotational orientation suitable for casting or feathering.

In order to prevent this, the shifting member in conventional configurations is provided with a braking member for contacting the reel unit and braking the rotor. When the shifting member has been shifted into the contact position, the braking member contacts the front surface of the reel unit, and is compressed, thus braking the rotor. Elastically braking the rotor like this when tripping the bail makes it possible to prevent rotation of the rotor while providing for the possibility to rotate the rotor in the line-winding direction if necessary.

In this conventional configuration, the rotor is braked by bringing a braking member that is attached to the shifting member into contact with the reel unit and compressing it. Therefore, when the contact position of the shifting member varies with respect to the horizontal direction because of manufacturing or assembly errors, the compression amount of the braking member varies as well. When the compression amount varies, the braking force of the rotor changes, and the rotor cannot be reliably braked.

Now, it would seem to be possible to provide the braking member on the reel unit, and to shift the shifting member in a direction perpendicular to the compression direction of the braking member from the end of the braking member towards an outer lateral surface, thereby bringing the shifting member into contact with the braking member. Thus, it would be possible to brake the rotor in a reliable manner, regardless of variations in the shifting amount of the shifting member. However, when the shifting member in this configuration contacts the end portion of the braking member, it is difficult to shift the shifting member smoothly; when the shifting member cannot be shifted smoothly, then it becomes difficult to switch the bail arm smoothly from the line-winding posture to the line-releasing posture.

Also, in the above-described conventional configuration, when the toggle spring urges the bail arm back into the line-winding posture, the shaft member does not pivot and only the link pivots with respect to the shaft member. Therefore, the spring force direction of the coil spring is different from the direction in which the link pushes the bail arm. Consequently, the force transmitted from the shaft member via the link to the bail arm is smaller the larger the pivot angle of the link is, and the force with which the toggle spring restores the bail arm to the line-winding posture is weak. When the spring force of the coil spring is increased in order to prevent this, the force needed to trip the bail arm from the line-winding posture into the line-releasing posture increases, so that it becomes more difficult to trip the bail arm.

SUMMARY OF THE INVENTION

An object of the present invention is, in a spinning reel rotor braking device that enables the rotor to be braked when in the line-releasing posture, to enable the rotor to be braked stably regardless of fluctuations in the amount by which the shifting member shifts, and moreover to enable the shifting member to shift smoothly when it comes into contact with the braking member.

Another object of the invention is, in a bail tripping device having a rotor braking mechanism, to enable the urging force of the toggle spring to be transmitted efficiently to the bail arm.

According to a first aspect of the present invention, a spinning reel rotor braking device for braking a rotor, which is mounted rotatively to a reel unit of a spinning reel, in response to pivoting a bail arm, which can be pivoted to a line-winding posture and a line-releasing posture, includes a shifting member and an elastic braking member. The shifting member is disposed at the rotor and is shifted from inside the rotor toward the reel unit when the bail arm is pivoted from the line-winding posture to the line-releasing posture. The elastic braking member is provided at the reel unit and includes a braking surface that extends substantially in parallel to a shifting direction of the shifting member and contacts the shifting member when the bail arm is in the line-releasing posture, and a conducting surface arranged in continuation with the braking surface on the side facing the shifting member, the conducting surface being formed obliquely, with the side that is facing the shifting member receding further away from the shifting member than the side that is away from the shifting member.

In this rotor braking device, when the bail arm pivots from the line-winding posture to the line-releasing posture, then the shifting member contacts the braking surface on the side of the conducting surface and the rotor is braked. The conducting surface is arranged on the side of the braking surface that faces the shifting member, the side of the conducting surface facing the shifting member receding further away from the shifting member than the side that is away from the shifting member, and the braking surface extends substantially in parallel to the shifting direction of the shifting member, so that even when the shifting amount of the shifting member varies, the braking power stays the same and the rotor can be braked reliably, while the shifting member contacts the braking surface from the side of the conducting surface that is formed such that the guiding member contacts the braking surface in a smooth manner.

According to a second aspect of the present invention, in a spinning reel rotor braking device as in the first aspect, the braking member is made of a substantially ring-shaped elastic material with rectangular cross section disposed at the front of the reel unit such that the braking member can contact the shifting member. This configuration enlarges the range of rotational positions of the rotor for which braking is possible.

According to a third aspect of the present invention, in a spinning reel rotor braking device as in the first aspect, the braking surface is an even circumferential surface formed on the peripheral surface of the braking member, and the conducting surface is an oblique surface formed at the front of the braking surface, a diameter of the conducting surface gradually decreasing in frontward direction, and the shifting member has a front end interlocking with the bail arm, and a rear end that is shiftable back and forth, in response to a pivoting of the bail arm, between a first position in which the shifting member is away from the reel unit and which corresponds to the line-winding posture, and a second position in which the shifting member is close to the reel unit, contacting the braking surface beyond the conducting surface, and which corresponds to the line-releasing posture. When the bail arm in this configuration is pivoted from the line-winding posture to the line-releasing posture, the shifting member shifts from the first position to the second position, and contacts the braking surface from the conducting surface side. As the shifting member shifts, it contacts the braking surface, which is provided on the outer peripheral surface of the braking member, so that the shifting member has a simple configuration.

According to a fourth aspect of the present invention, in a spinning reel rotor braking device as in the third aspect, the conducting surface is a tapered face shaped like a truncated cone whose diameter gradually decreases in frontward direction. With this configuration, the conducting surface has a simple shape, so that the conducting surface can be formed easily.

According to a fifth aspect of the present invention, in a spinning reel rotor braking device as in the third aspects, the conducting surface is a rounded surface whose diameter gradually decreases in frontward direction. With this configuration, the conducting surface is rounded, so that when the shifting member is shifted and contacts first the conducting surface and then the braking surface, a smooth shifting motion and smooth switching between the bail arm positions is achieved.

According to a sixth aspect of the present invention, in a spinning reel rotor braking device as in the third aspect, the front end of the shifting member is bent toward a vicinity of the pivoting center of the bail arm so as to be oriented substantially in parallel to the pivot axis, wherein the rear end of the shifting member is bent toward a rotation axis of the rotor, and between the front end and the rear end, the shifting member is arranged substantially in parallel to a rotation axis of the rotor, and the rear end is interlocked with the rotor and can be shifted back and forth, and the front end is interlocked with an engagement recess formed in the bail arm and can be shifted along a direction. With this configuration, the pivoting motion of the bail arm can be easily converted into a linear motion of the front end of the shifting member, simply by interlocking the bent front end portion of the shifting member with the bail arm, and interlocking the rear end portion such that it can shift back and forth.

According to a seventh aspect of the present invention, in a spinning reel rotor braking device as in the sixth aspect, the engagement recess is an arc-shaped groove formed along a pivot direction in the bail arm. With this configuration, the shifting member starts to shift when the bail arm is pivoted and the one end of the shifting member abuts against the distal end of the arc-shaped groove. Then, when the shifting member has been shifted, the toggle spring mechanism exerts a spring force on the bail arm and the bail arm is pivoted further, until the one end of the shifting member abuts against the proximal end of the groove. Thus, it is possible to let the bail arm pivot for a greater distance than the shifting member shifts.

According to an eighth aspect of the present invention, in a spinning reel rotor braking device as in the sixth aspect, a rear end surface of the shifting member, which comes into contact with the braking surface, is rounded. In this configuration, the rear end surface of the shifting member, contacting the braking member, is rounded, so that when the shifting member is shifted and contacts the braking member or is separated from the braking member, a smooth shifting motion and smooth switching between the two positions is achieved.

According to a ninth aspect of the present invention, a spinning reel rotor braking device as in the third aspect further includes a toggle spring mechanism having a front end that is interlocked rotatively with the bail arm, the toggle spring mechanism toggling and biasing the bail arm into the line-winding posture and the line-releasing posture, and a tripping wedge disposed on the front of the reel unit, wherein, when the rotor rotates in line-winding direction, the tripping wedge contacts the protruding rear end of the shifting member in the second position and shifts the shifting member toward the first position. With this configuration, the spinning reel includes both a bail tripping device and a rotor braking device as structural elements, and a compact spinning reel is accomplished.

According to a tenth aspect of the present invention, in a spinning reel rotor braking device as in the ninth aspect, the toggle spring mechanism has a front end that is interlocked rotatively with the bail arm at a position that is different from an interlocking position of the shifting member, the toggle spring mechanism toggles and biases the bail arm into the line-winding posture and the line-releasing posture, wherein the biasing direction changes depending on the pivoting of the bail arm.

With this device, when the bail arm is tripped from the line-winding posture to the line-releasing posture, the other end of the shifting member is shifted into the second position. Thus, after the toggle spring mechanism has been compressed to the dead point, it expands and urges the bail arm into the line-releasing posture. In this situation, when the rotor is rotated in the line-winding direction, the tripping wedge contacts the front end of the shifting member in the second position, and the shifting member is pushed into the first position. Thus, the bail arm is pivoted toward the line-winding posture. When the dead point of the toggle spring is passed, the toggle spring mechanism expands, and the bail arm is pushed into the line-winding posture. As a result, the bail arm trips into the line-releasing posture, in which it is held. During the pivoting into this line-winding posture, the direction of the spring force of the toggle spring mechanism changes depending on the pivoting of the bail arm. Because the spring force of the toggle spring mechanism changes depending on the pivoting of the bail arm when the bail arm is pivoted, the spring force of the toggle spring mechanism can be transmitted efficiently to the bail arm.

According to a eleventh aspect of the present invention, in a spinning reel rotor braking device as in the ninth or tenth aspect, the toggle spring mechanism comprises a shaft member having a first end interlocking with the bail arm, a guide member disposed pivotably with respect to the rotor, the shaft member being guided into and out of the guide member, and a spring member disposed in the guide member and urging the shaft member out of the guide member. With this configuration, when the bail arm pivots, the guide member of the toggle spring mechanism pivots together with the bail arm, so that the direction in which the bail arm is pressed changes depending on the pivoting of the bail arm, and the spring force of the coil spring is transmitted efficiently via the shaft member to the bail arm.

According to a twelfth aspect of the present invention, in a spinning reel rotor braking device as in the ninth or tenth aspect, the toggle spring mechanism comprises a shaft member having a first end interlocking with the bail arm, and a spring member that is guided by the rotor and urges the shaft member in a certain direction, the spring member having a first end that is engaged with the shaft member and a second end that is engaged with the rotor. With this configuration, the configuration of the toggle spring mechanism is simplified, and the toggle spring mechanism can be made lighter.

According to a thirteenth aspect of the present invention, in a spinning reel rotor braking device as in the twelfth aspect, the spring force member is a coil spring disposed around the shaft member, a winding diameter of the end of the coil spring interlocking with the shaft member being smaller than the winding diameter at other positions. With this configuration, the winding diameter at one end of the coil spring is small and that at other positions is large, so that when this one end is interlocked with the shaft member, a large gap is provided between the shaft member and the coil spring. Therefore, the coil spring is not easily deformed when the shaft member changes its position inside the coil spring.

According to a fourteenth aspect of the present invention, a spinning reel rotor braking device as in the twelfth aspect further includes a sheet member made of a synthetic resin for guiding the spring force member, arranged between the spring force member and the rotor. With this configuration, the spring force member does not come in direct contact with the rotor, so that the rotor is not damaged when the spring force member extended and compressed. Thus, corrosion of the rotor can be prevented when the rotor is made of a relatively easily corroding metal, such as a magnesium alloy. Also, with a sheet member made of a synthetic resin, the spring force member can be easily extended and compressed.

According to a fifteenth aspect of the present invention, in a spinning reel bail rotor braking as in the ninth aspect, the braking member is D-shaped, leaving room in radial direction for the tripping wedge. With this configuration, the tripping wedge and the braking member can be both arc-shaped and arranged next to one another, and the other end of the shifting member can be made shorter.

According to an sixteenth aspect of the present invention, in a spinning reel rotor braking device as in the ninth aspect, the tripping wedge has a first oblique surface whose leading side with respect to a line-winding rotation of the rotor protrudes further from the front of the reel unit towards the rotor than its trailing side. With this configuration, when the rotor starts to rotate in the line-winding direction, the shifting member contacts the first oblique surface of the tripping wedge and is gradually pushed toward the rotor. This returns the bail arm to the line-winding posture. Here, with the first oblique surface, the bail arm can be restored smoothly to the line-winding posture more.

According to a seventeenth aspect of the present invention, in a spinning reel rotor braking device as in the sixteenth aspect, the tripping wedge further has a second oblique surface, formed in continuation with the protruding portion of the first oblique surface, the second oblique surface receding from the protruding portion of the first oblique surface towards the leading side with respect to the line-winding rotation of the rotor. With this configuration, a second oblique surface is provided, arranged at an angle to the first oblique surface, so that when the rotor is rotated in the direction rolling off line and the shifting member contacts the tripping wedge, the shifting member is smoothly guided to the tripping wedge by the second oblique surface, and is less easily damaged.

According to an eighteenth aspect of the present invention, in a spinning reel rotor braking device as in the sixteenth aspect, at least a portion of the oblique surfaces of the tripping wedge protrudes further toward the rotor than a portion where the braking member contacts the shifting member. With this configuration, even when a braking member is provided, the shifting member abuts reliably against the tripping wedge, and the bail arm is returned from the line-releasing posture to the line-winding posture.

According to a nineteenth aspect of the present invention, in a spinning reel rotor braking device as in the first aspect, the braking surface is an even ring-shaped surface formed on a front surface of the braking member, and the conducting surface is an oblique surface formed at on outer peripheral side of the braking surface, a diameter of the conducting surface gradually increasing in rearward direction, and the shifting member includes a coupling portion having a front end interlocking with the bail arm, the coupling portion being shiftable, in response to a pivoting of the bail arm, between a first position in which the coupling portion is away from the reel unit and which corresponds to the line-winding posture, and a second position in which the coupling portion is close to the reel unit and which corresponds to the line-releasing posture, and a shifting portion provided at the rotor and shifting in a radial direction when the coupling portion shifts between the first position and the second position, wherein, the shifting portion contacts the braking surface beyond the conducting surface when the coupling portion shifts the first position to the second position. With this configuration, the braking surface is formed at the front end surface of the braking member, so that it is easier to ensure a flat braking surface, and a more even braking force can be achieved.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Figure 1:
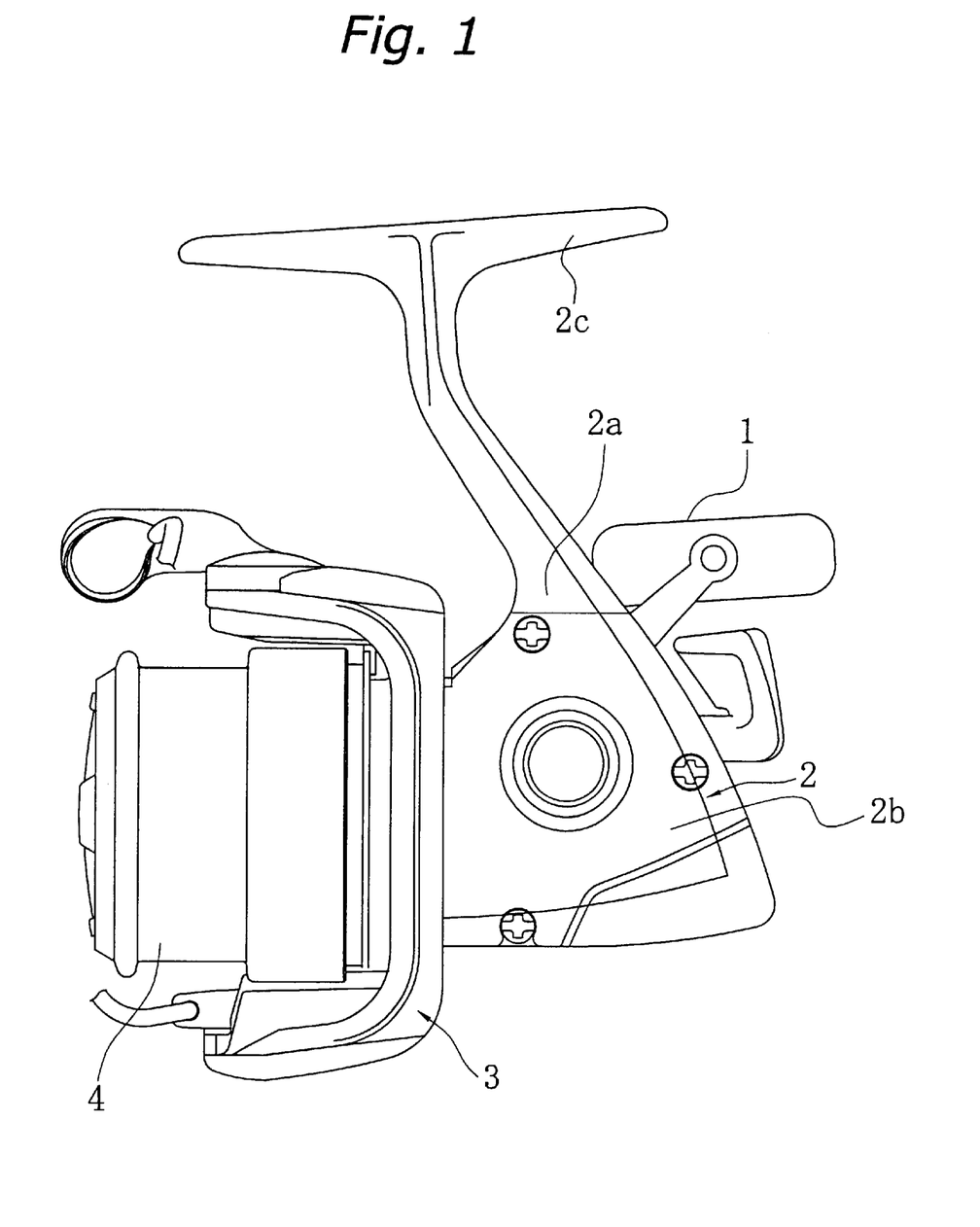
FIG. 1 is a left-side view of a spinning reel in which one embodiment of the present invention is adopted.

As shown in FIG. 1, a spinning reel in accordance with an embodiment of the present invention includes a handle 1, a reel unit 2 rotatively supporting the handle 1, a rotor 3, and a spool 4. The rotor 3 is rotatively supported on the front of the reel unit 2. Fishing line winds around the outer peripheral surface of the spool 4, which is disposed on the front of the rotor 3 and can be shifted back and forth.

The reel unit 2 includes a reel body 2a in the interior of which is a space, and a lid member 2b mounted detachably to the reel body 2a, for closing off the space in the reel body 2a.

Figure 2:
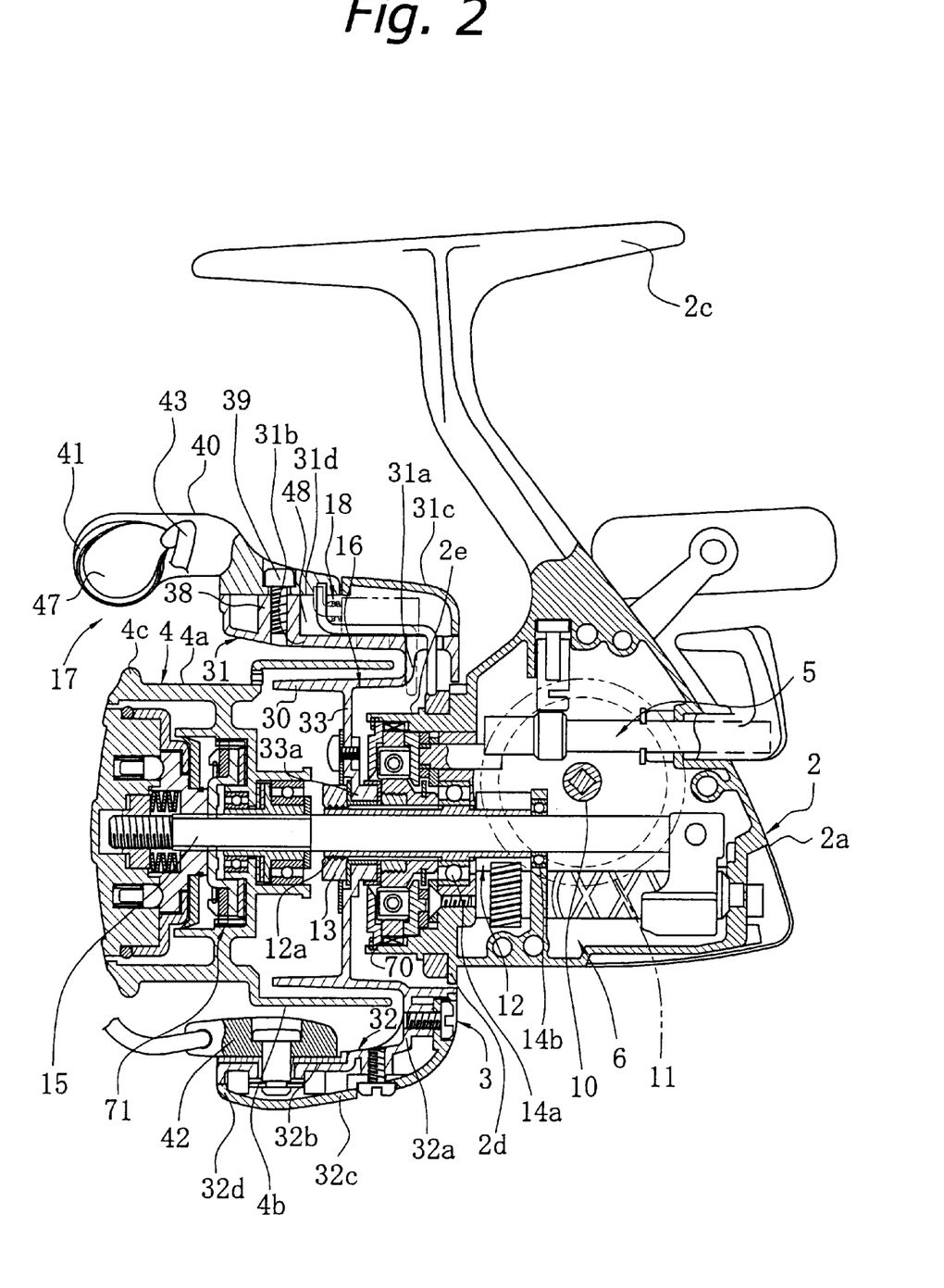
FIG. 2 is a partly in sectional view of the FIG. 1 spinning reel.
Figure 5:
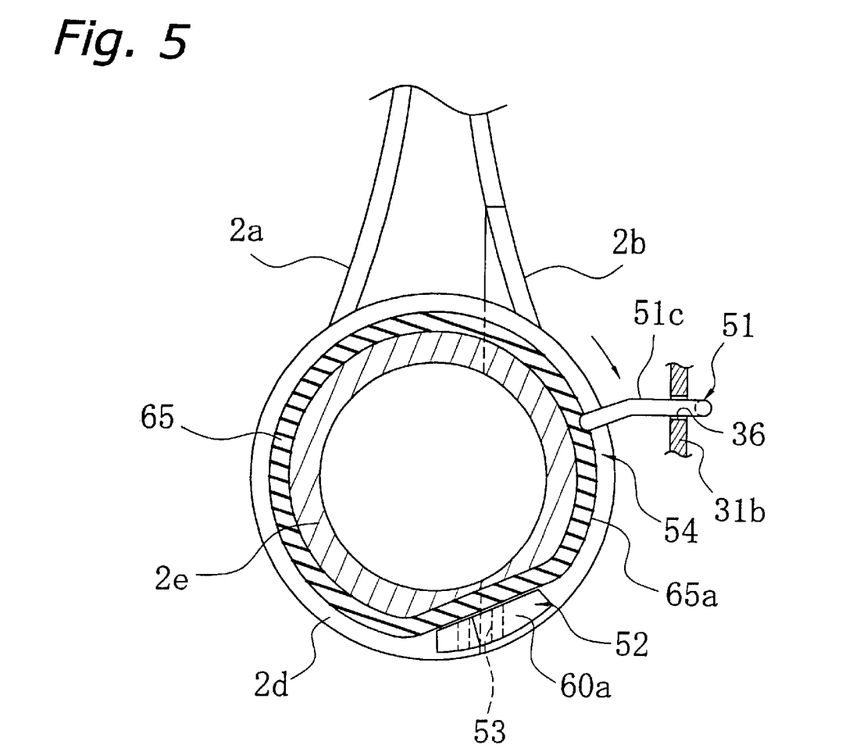
FIG. 5 is an elevational view of a section of the reel body, illustrating the bail tripping mechanism.

The reel body 2a is made, for example, of a magnesium alloy, and is formed unitarily with a T-shaped rod attachment leg 2c extending horizontally on the top of the reel body 2a. As shown in FIG. 2, the space in the reel body 2a accommodates a rotor driving mechanism 5 that transmits rotation of the handle 1 to rotate the rotor 3, and an oscillation mechanism 6 that shifts the spool 4 back and forth to wind on fishing line uniformly. A circular flange portion 2d and a cylindrical portion 2e are formed on the front of the reel body 2a and the lid member 2b. The cylindrical portion 2e is open on the front and is smaller in diameter than the flange portion 2d. The cylindrical portion 2e in cross-section is, as shown in FIG. 5, formed into a D-shape that is a circle with a part lopped off.

Figure 6:
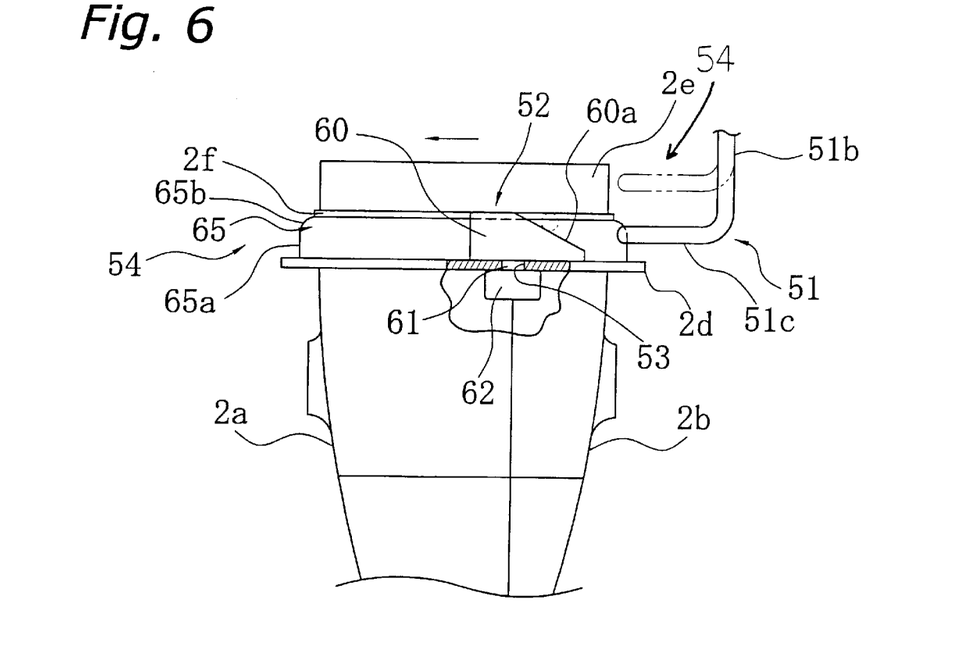
FIG. 6 is a partial underside view of the reel body, illustrating the bail tripping mechanism.

The lid member 2b is made, for example, of a magnesium alloy, and screwed in three locations to the reel body 2a. As shown in FIGS. 5 and 6, a later-described tripping wedge 52 is mounted detachably onto the flange portion 2d at a place where the reel body 2a and the lid member 2b split.

As shown in FIG. 2, the rotor driving mechanism 5 includes a handle shaft 10, a face gear 11 and a pinion gear 12. The face gear 11 rotates together with the handle shaft 10, on which the handle 1 is mounted non-rotatively. The pinion gear 12 meshes with the face gear 11. The pinion gear 12 is tubular. Its front portion 12a penetrates the center of the rotor 3, and is fixed with a nut 13 to the rotor 3. The middle and the rear end (with respect to the axial direction) of the pinion gear 12 are rotatively supported by bearings 14a and 14b in the reel unit 2.

The oscillating mechanism 6 shifts the spool 4 back and forth, shifting back and forth the spool shaft 15 to which the center of the spool 4 is coupled via a drag mechanism 71.

Rotor Configuration

As shown in FIG. 2, the rotor 3 includes a rotor unit 16, a bail arm 17, and a bail tripping mechanism 18. The bail arm 17 is disposed on the front of the rotor unit 16 and is pivotable between a line-releasing posture and a line-winding posture. The bail tripping mechanism 18 is mounted on the rotor unit 16 and is for returning the bail arm 17 into the line-winding posture.

The rotor unit 16 includes a cylindrical portion 30, a first rotor arm 31 and a second rotor arm 32. The cylindrical portion 30 is attached to the reel body 2a and can rotate freely around the spool axis 15. The first rotor arm 31 and the second rotor arm 32 are arranged in opposition to one another on the sides of the cylindrical portion 30. The cylindrical portion 30, the first rotor arm 31 and the second rotor arm 32 can be made, for example, of an aluminum alloy, and are formed unitarily.

A front wall 33 is formed at the front of the cylindrical portion 30, and a boss portion 33a is formed in the center of this front wall 33. A through hole is formed in the center of the boss portion 33a, and the front end 12a of the pinion gear and the spool shaft 15 are passed through this through hole. The nut 13 is provided to attach the rotor 3 to the front of the front wall 33.

Figure 3A:
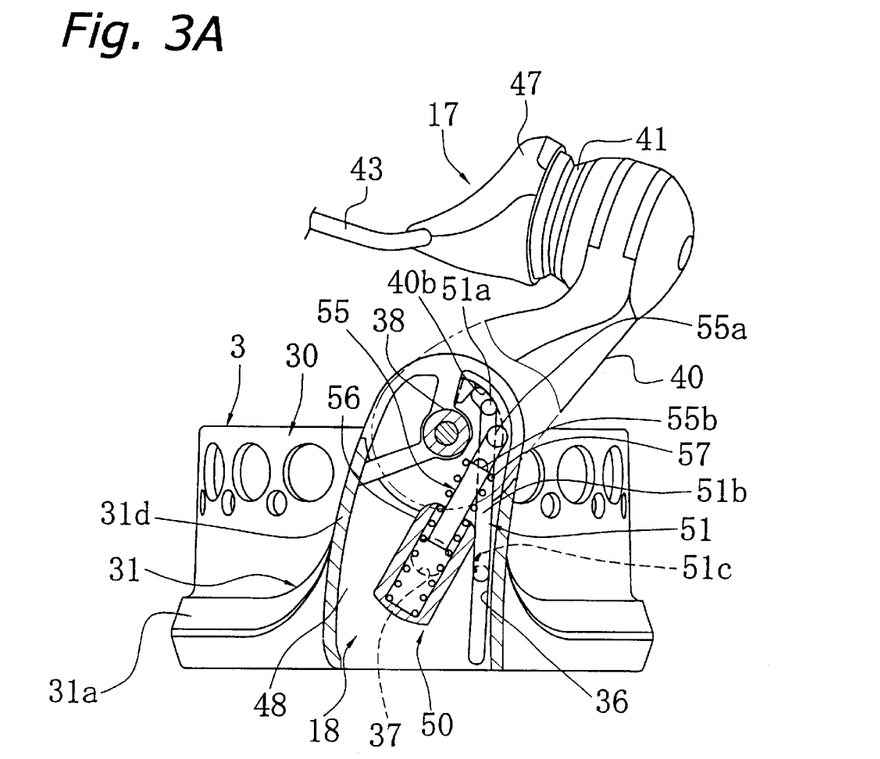
FIGS. 3A and 3B are overhead oblique view of a first rotor arm with its cover removed, on the spinning reel rotor.
Figure 3B:
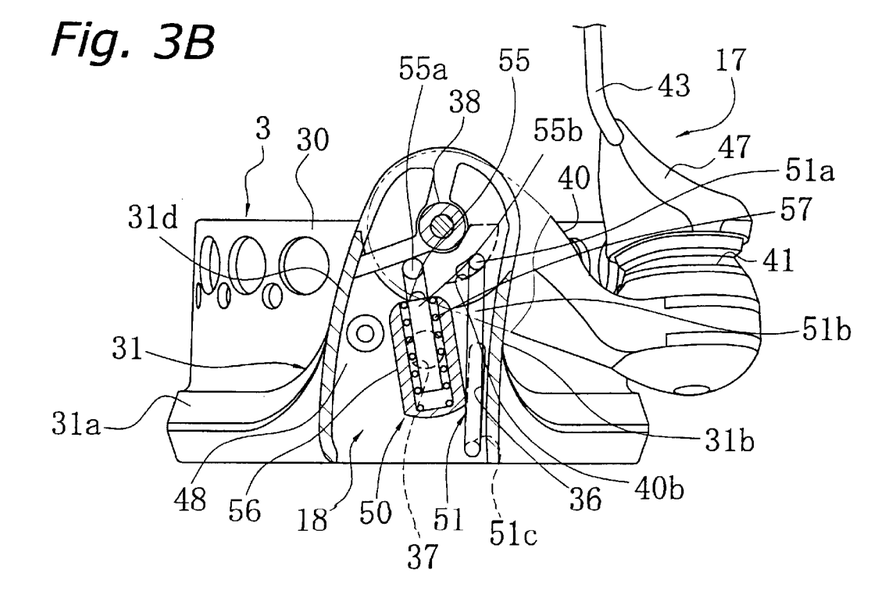
Figure 4:
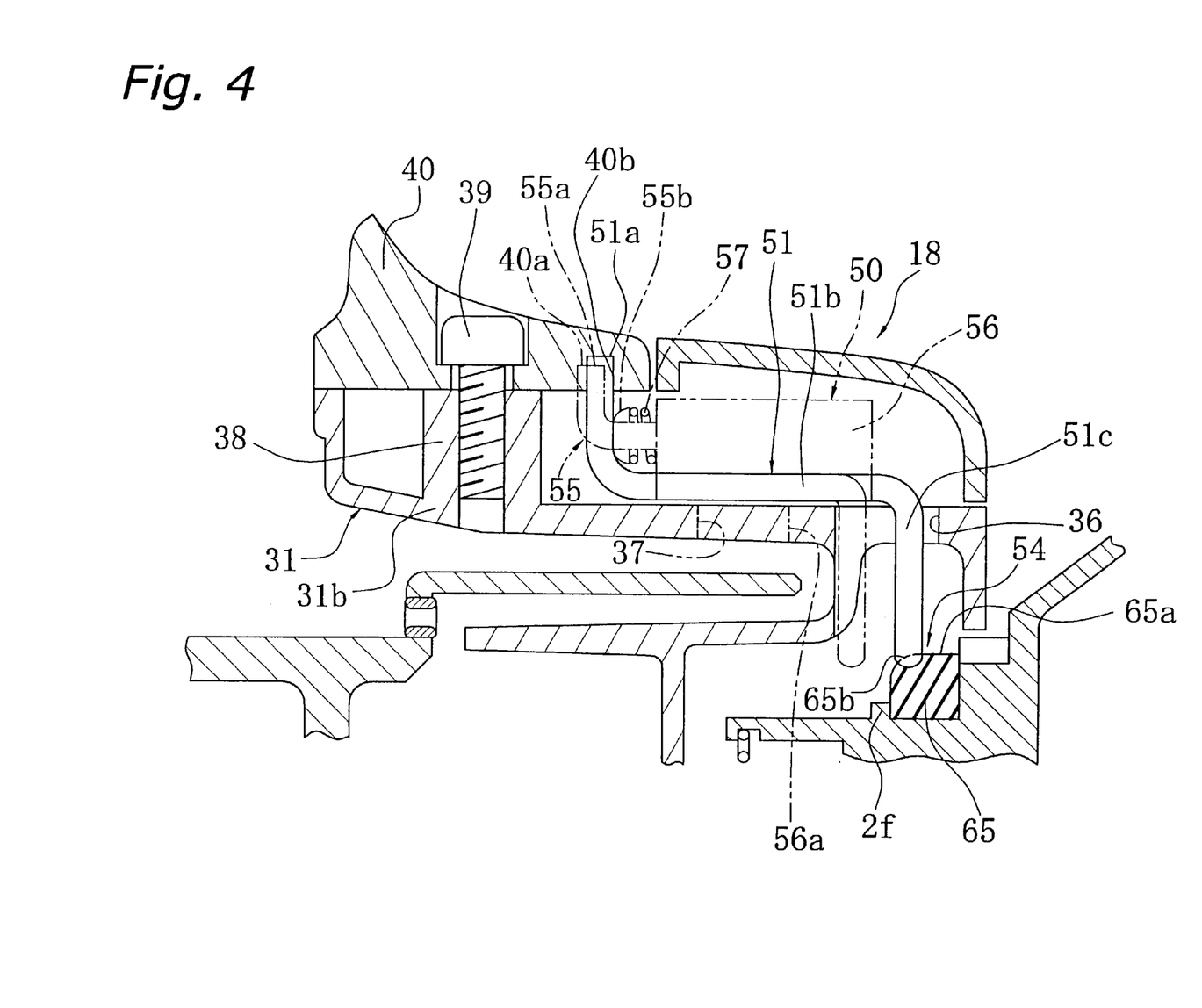
FIG. 4 is an enlarged fragmentary sectional view of the first rotor arm.

The first and second rotor arms 31 and 32, as shown in FIGS. 2–4, include: first and second connecting portions 31a and 32a respectively disposed on the hind-end circumferential surface of the cylindrical portion 30; first and second arm portions 31b and 32b that extend frontward curving to bulge outward respectively from the first and second connecting portions 31a and 32a; and first and second cover members 31c and 32c that respectively cover the outward parts of both the two connecting portions 31a and 32a and the two arm portions 31b and 32b. The first and second connecting portions 31a and 32a are formed to join smoothly with the cylindrical portion 30 peripherally.

The first and second arm portions 31b and 32b are formed to join smoothly with the first and second connecting portions 31a and 32a and extend frontward, spreading at a spacing from the cylindrical portion 30. The first and second arm portions 31b and 32b curve smoothly heading from their tips to the place where they are connected to the cylindrical portion 30. Openings 31d and 32d are provided in outer portions of both the two connecting portions 31a and 31b and the two arm portions 31b and 32b, and the first and second cover member 31c and 32c close off the openings 31d and 32d over their respective outer peripheral sides. An accommodation space 48 is formed between the first cover member 31c, the first connecting portion 31a and the first arm portion 31b.

A first bail support member 40 is fitted to allow it to pivot on the outer peripheral side of the forward end of the first rotor arm 31b. Formed on the first arm portion 31b are, as shown in FIG. 4, a slot 36 and a fitting hole 37 for fitting the bail tripping mechanism 18, and a boss portion 38 with a threaded hole for attaching the first bail support member 40.

The second bail support member 42 is fitted to allow it to pivot on the inner peripheral side of the forward end of the second rotor arm 32b.

The first bail support member 40 is attached with a threaded attachment pin 39 to the first rotor arm 31 at the front end of the first rotor arm 31b. The attachment pin 39 consists of a low-burring Allen screw to make it unlikely that fishing line gets caught on the head.

As shown in FIG. 3, a line roller 41 for guiding fishing line to the spool 4, and a fixed shaft cover 47 are fixed to the front of the first bail support member 40, with the line roller 41 being arranged between the first bail support member 40 and the fixed shaft cover 47. The line roller 41 is mounted rotatively on the front end of the first bail support member 40. The fixed shaft cover 47 is shaped like a deformed cone with a pointed tip. A bail 43, made by bending a wire into roughly a U-shape, is fixed between the tip of the fixed shaft cover 47 and the second bail support member 42. The first and second bail support members 40 and 42, the line roller 41, the bail 43, and the fixed shaft cover 47 constitute the bail arm 17, which guides fishing line onto the spool 4. The bail arm 17 can be pivoted between a line-winding posture shown in FIG. 3A and, tripping it over from the line-winding posture, a line-releasing posture shown in FIG. 3B.

Bail Tripping Mechanism Configuration

The bail tripping mechanism 18 is disposed in the accommodation space 48. When the rotor 3 is rotated, the bail tripping mechanism 18 restores the bail arm 17 from the line-release position to the line-winding posture. At the same time, the bail tripping mechanism 18 retains the bail arm 17 as it is in either posture.

As shown in FIGS. 3–6, the bail tripping mechanism 18 includes a toggle spring mechanism 50, a shifting member 51, a tripping wedge 52, and a rotor braking mechanism 54 for braking the rotor 3. The toggle spring mechanism 50 is disposed within the accommodation space 48 and pivotably attached to the first arm portion 31b. The shifting member 51 is fitted to allow it to shift back and forth within the accommodation space 48. The tripping wedge 52 is fitted detachably onto the flange portion 2d, where it is able to come into contact with the shifting member 51.

As shown in FIGS. 3A and 3B, the toggle spring mechanism 50 is arranged inside the first rotor arm 31, and can assume a first position (FIG. 3A), in which the bail arm 17 is in line-winding posture, and a second position (FIG. 3B), in which the bail arm 17 is in line-releasing posture. The toggle spring mechanism 50 serves as a mechanism for retaining the bail arm 17 in the line-winding and line-releasing postures. The toggle spring mechanism 50 includes a rod 55, a guide member 56, and a coil spring 57. One end of the rod 55 is interlocked with the first bail support member 40, whereas the other end extends along the first arm portion 31b. The rod 55 is fitted allowing it to advance/retreat into the guide member 56, the mid-portion of which meanwhile is pivotably attached to the first arm portion 31b. The coil spring 57 urges the rod 55 advancing outward the guide member 56.

As shown in FIG. 4, the front end portion 55a of the rod 55 is bent towards the outer peripheral side, and is engaged with an engagement hole 40a formed in the first bail support member 40. A spring-interlocking protrusion 55b is formed circumferentially on the rod 55.

The guide member 56 is a front-end open polygonal tube having a bottom. At a mid-portion axially, the guide member 56 has a pivot shaft 56a that protrudes for engagement into the mounting hole 37. The pivot shaft 56a is oriented in the radial direction of the rotor 3 and the guide member 56 is attached to the first rotor arm 31, letting it pivot centered on the pivot shaft 56a.

The toggle spring mechanism 50 is disposed to position in directions in which, in the line-winding posture and the line-releasing posture, the interlock position of the rod 55 against the first bail support member 40 differs with respect to a line joining the axis of the pivot shaft 56a and the pivot axis of the first bail support member 40. Thus, the toggle spring mechanism 50 toggle-urges the bail arm 17 into the two postures, retaining it in either posture.

The shifting member 51 is, for example, a filament made of metal, such as stainless steel, and its two ends are bent to 90° angles pointing into different directions. The shifting member 51 can be shifted in the first arm portion 31b substantially horizontally between a withdrawn position shown in FIG. 3A and a contact position shown in FIG. 3B.

As shown in FIGS. 3–6, the forward end 51a of the shifting member 51 is bent over toward the outer peripheral side of the first bail support member 40. An arcuate engagement groove 40b is formed in the first bail support member 40 going along its pivoting direction, and the forward end 51a of the shifting member is interlocked with either end of the engagement groove 40b in the pivoting direction. The middle 51b extends along the first arm portion 31b, lying radially inward of the rod 55. The rear end 51c of the shifting member 51 is bent over from the middle 51b toward the inner peripheral side, and then further towards the center (rotation axis) of the rotor 3. Thus orienting the rear end 51c towards the center of the rotor 3 makes transmission of power smooth when the shifting member 51 comes into contact with and is pressed by the tripping wedge 52. Further, interlocking the forward end 51a in the ends of the arcuate engagement groove 40b makes the amount the shifting member shifts less, by the length in the arcuate direction of the engagement groove 40b, than the amount the bail arm pivots. The rear end 51c penetrates the slot 36 and extends inward to a position where its somewhat rounded tail-end face slightly overlaps the front-end face of a braking member 65 that forms a component of the rotor braking mechanism 54. The width of the slot 36 is of roughly the same dimension as the diameter of the shifting member 51. Therefore, the rear end 51c of the shifting member 51 shifts back and forth along the slot 36 in cooperation with pivoting of the bail arm 17.

When the bail arm 17 is in the line-releasing posture, the end of the shifting member 51 interlocking with the engagement groove 40b is positioned further line-winding posture-ward than a line segment joining the rear end 51c and the pivot center of the bail arm 17. That is, the shifting member 51 is arranged such that in both the withdrawn position and the contact position, the location where it interlocks with the first bail support member 40 is present in the same bearing from a line segment joining the axis of the rear end 51c (FIG. 3B) when in the contact position and the pivot axis of the first bail support member 40. Thus, when the rear end 51c of the shifting member 51 is pressed by the tripping wedge 52, the first bail support member 40 is brought back into the line-winding posture. When in the contact position, the end face of the rear end 51c digs into the braking member 65 depth-ward from its front-end face, and inward somewhat from its circumferential face. Therefore, even when the amount by which the shifting member 51 shifts slightly fluctuates, the same braking force is always gained.

The rotor braking mechanism 54 brakes the rotor 3 when the bail arm 17 has pivoted into the line-releasing posture, and includes the shifting member 51 and the braking member 65 fitted to the base end of the cylindrical portion 2e. That is, the shifting member 51 is a component of the bail tripping mechanism 18, and at the same time is a component of the rotor braking mechanism 54.

The purpose of the braking member 65 is to brake the rotation of the rotor 3 when the bail arm 17 is in the line-releasing posture. The braking member 65 is an elastic ring with rectangular cross section made of a synthetic rubber, such as styrene-butadiene rubber (SBR), acrylonitrile-butadiene rubber, butadiene rubber, isoprene rubber, chloroprene rubber, silicone rubber or urethane rubber. The outer peripheral surface of the braking member 65 is provided with an even peripheral braking surface 65a, except at the portion evading the tripping wedge 52. The braking member 65 is mounted on the base of the cylindrical portion 2e, which has a D-shaped cross section. Consequently, the braking member 65 is mounted in D-shape when viewed head on. The straight portion of the braking member 65 is provided to leave room for the tripping wedge 52. At the front edge of the braking surface 65a of the braking member 65, a conducting surface 65b is formed in continuation to the braking surface 65a. The conducting surface 65b is formed on the side facing the shifting member 51, such that the side that faces the shifting member 51 recedes further away from the shifting member 51 than the side that is away from the shifting member. In this embodiment, the conducting surface 65b is formed as a rounded surface that is rounded in continuation with the braking surface 65a. Forming such an oblique conducting surface 65b in continuation with the braking surface 65a, the rounded front end of the shifting member 51 contacts the conducting surface 65b of the braking member 65 first before it smoothly contacts the braking surface 65a. Therefore, the switching of the positions of the bail arm 17 is performed in a smooth manner. An annular protrusion 2f is formed on the outer peripheral surface of the cylindrical portion 2e at a certain spacing to the flange 2d, and the braking member 65 is disposed between the flange 2d and the annular protrusion 2f, in contact with both.

The tripping wedge 52 is made of a synthetic resin, such as nylon 66 or polyacetal, and, as shown in FIGS. 5 and 6, it is mounted detachably on the flange 2d at the portion where the reel body 2a and the lid member 2b can be taken apart. The portion where the reel body 2a and the lid member 2b can be taken apart is provided with a rectangular cutout 53. The tripping wedge 52 includes a cam portion 60 having an incline surface 60a, and a neck portion 61 and a brim portion 62, formed unitarily with the cam portion 60. The incline surface 60a is an oblique face whose downstream side in the fishing line take-up direction of the rotor 3 (indicated by the arrow in FIG. 6) protrudes forward toward the rotor 3 more than the upstream side. The size of the neck portion 61 is such that the neck portion can be fitted into the cut-out 53, and the gap between the cam portion 60 and the brim portion 62 is approximately the same as the wall thickness of the flange portion 2d. The brim portion 62 has a larger cross-section than the neck portion 61, and contacts the back of the flange portion 2d.

When the lid member 2b is attached to the reel body 2a, the tripping wedge 52 can be fixed to the reel unit 2 simply by fitting the neck portion 61 into the cut-out 53 on the side of the reel body 2a and fastening the lid 2b on the reel body 2a with screws. Thus, the tripping wedge 52 can be fastened in a straightforward manner without other parts for fastening the tripping wedge 52. Furthermore, even though the reel unit 2 is made of a magnesium alloy susceptible to corrosion, the tripping wedge 52 contacting the shifting member 51 is provided separately from the reel unit 2, so that the reel unit 2 is not damaged when the bail arm 17 is tripped over. Therefore, corrosion due to such damage can be prevented. Furthermore, the tripping wedge 52 mounted on the reel unit 2 is made of an insulating synthetic resin, so that the reel unit 2 is not subject to electrolytic corrosion even though the tripping wedge 52 contacts the reel unit 2.

This toggle spring mechanism 50 can be toggled between a first position shown in FIG. 3A and a second position shown in FIG. 3B. The first position corresponds to the line-winding posture of the bail arm 17, and the second position corresponds to the line-releasing posture of the bail arm 17. Furthermore, the shifting member 51 is shifted back and forth between the withdrawn position shown in FIG. 3A and the contact position shown in FIG. 3B, the rear end portion 51c of the shifting member 51 being guided by the slot 36. The withdrawn position corresponds to the line-winding posture, whereas the contact position corresponds to the line-releasing posture. In the contact position, the end face of the rear end portion 51c of the shifting member 51 contacts the braking surface 65a such that it is slightly compressed depth-ward from the front-end face of the braking member 65. Therefore, even if the shifting position, i.e. the contact position, of the shifting member 51 fluctuates in the axial direction the braking force does not fluctuate. Further, in the contact position, when the rotor 3 is rotated in the direction taking up line, the peripheral surface of the rear end 51c of the shifting member 51 contacts the incline surface 60a of the tripping wedge 52, and the shifting member 51 is pressed forward, toward the withdrawn position.

As shown in FIG. 2, a reverse rotation check mechanism 70 for blocking and releasing reverse rotation of the rotor 3 is provided inside the cylindrical portion 30 of the rotor 3. This reverse rotation check mechanism 70 has a roller-type one-way clutch and blocks or releases the reverse rotation of rotor 3 by switching the one-way clutch between an operating state and a non-operating state.

The spool 4 is arranged between the first rotor arm 31 and the second rotor arm 32 of the rotor 3, and is disposed at the front end of the spool shaft 15 with the drag mechanism 71 interposed between the spool shaft 15 and the spool 4. The spool 4 includes a bobbin trunk portion 4a for winding fishing line around its circumference, a skirt portion 4b formed unitarily with the rear of the bobbin trunk portion 4a, and a flange portion 4c formed unitarily with the front of the bobbin trunk portion 4a.

Reel Function and Operation

When casting, the reverse rotation check mechanism 70 blocks reverse rotation of the rotor 3, and the bail arm 17 trips into line-releasing posture. Tripping the bail arm 17 into the line-releasing posture causes the first bail support member 40 and the second bail support member 42 to flip over backwards, so that the bail tripping mechanism 18 assumes the second position shown in FIG. 3B. When the bail arm 17 has flipped into the line-releasing posture, fishing line can be rolled off easily from the spool 4.

When pivoting from this line-winding posture to the line-releasing posture, the rotation of the first bail support member 40 causes the rod 55 in the toggle spring mechanism 50 to pivot in anti-clockwise direction in FIG. 3A while retreating gradually, thereby assuming the second position shown in FIG. 3B. In this situation, the rod 55 retreats until it crosses the dead point. When crossing the dead point, the spring force of the coil spring 57 pushes the rod 55 out, whereby the bail arm 17 switches to the line-releasing posture, which is held by the spring force.

When the bail arm 17 pivots into the line-releasing posture—when the forward end 51a of the shifting member 51 contacts the end of the engagement groove 40b upstream in its pivoting direction—the shifting member 51 starts to shift from the withdrawn position toward the contact position. Then, when the second position is reached, the end surface of the rear end 51c of the shifting member 51 elastically contacts the braking surface 65a of the braking member 65, slightly indenting it. This brakes the rotor 3 and holds its rotational orientation. In this situation, the end surface of the rear end portion 51c of the shifting member 51 elastically contacts the braking surface 65a of the braking member 65, slightly indenting it, so that even when the contact position of the shifting member 51 is displaced in axial direction, the shifting member 51 still remains in a contact position, and the braking force stays the same. The shifting member 51 elastically contacts the braking member 65 and brakes the rotor 3 only by friction, so that the rotational orientation of the rotor 3 can be easily adjusted by turning it by hand or with the handle 1. This means, the rotational orientation is maintained by the frictional force braking the rotor 3, so that the rotor 3 does not rotate when the bail arm 17 is in the line-releasing posture. This counters the problem that the rotor 3 suddenly starts to rotate when casting or feathering. Also, since the rotor 3 is braked by friction only, it is easy to adjust its rotational orientation by applying a force to the rotor 3.

In this situation, the fishing rod is cast while holding fishing line with the index finger of the hand with which the fishing rod is held. Thus, fishing line is released with high momentum due to the weight of the bait and terminal tackles.

After the casting, when the handle 1 is turned, for example with the left hand, in the direction taking up line while the bail arm 17 is still in the line-releasing posture, the rotor driving mechanism 5 rotates the rotor 3 in the direction taking up line. When the rotor 3 rotates in the direction taking up line, the bail tripping mechanism 18 restores the bail arm 17 into the line-winding posture.

To be more specific, in FIGS. 5 and 6, the shifting member 51 turns clockwise (in arrow direction) together with the rotor 3. The peripheral surface of the rear end portion 51c of the shifting member 51 abuts against the incline surface 60a of the tripping wedge 52 fixed to the reel unit 2. This pushes the shifting member 51 forward, switching it to the withdrawn position indicated by the phantom line in FIG. 6, and pivoting the first bail support member 40 into the line-winding posture. Thus, the guide member 56 of the toggle spring mechanism 50 pivots from the second position shown in FIG. 3B toward the first position shown in FIG. 3A. Then, as the dead point is crossed, the spring force of the coil spring 57 pushes the rod 55 out, switching the bail arm 17 to the line-winding posture, and this position is held by the spring force. When the bail arm 17 is restored to the line-winding posture, the first bail support member 40 and the second bail support member 42 both point to the front, as shown in FIGS. 1 and 2. When the bail arm 17 has returned to the line-winding posture, fishing line is guided to the spool 4 by the bail arm 17, and wound around the spool 4.

Figure 7A:
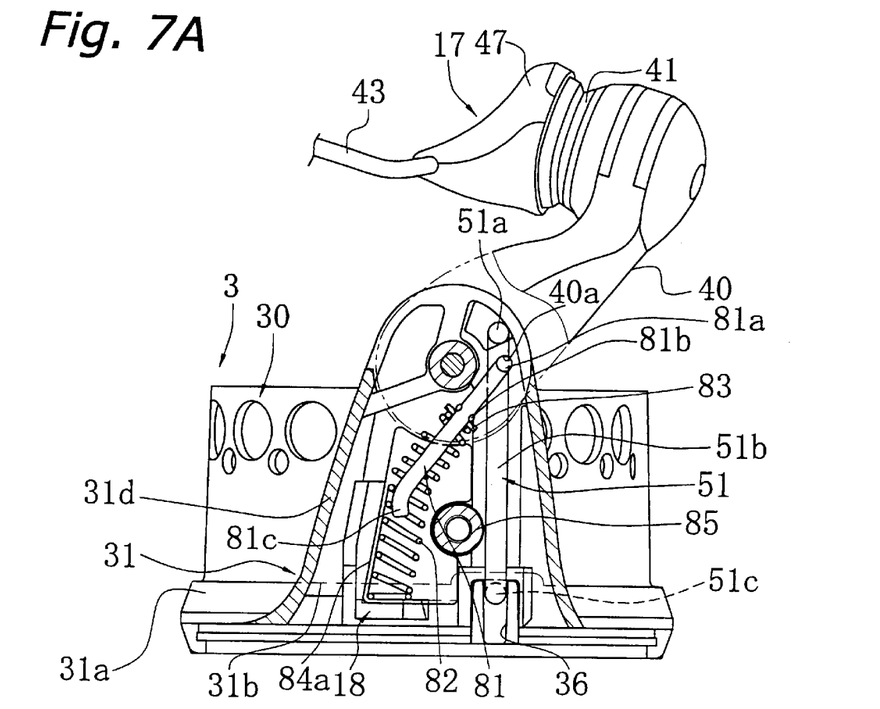
FIGS. 7A and 7B are views corresponding to FIGS. 3A and 3B, of another embodiment of the present invention.
Figure 7B:
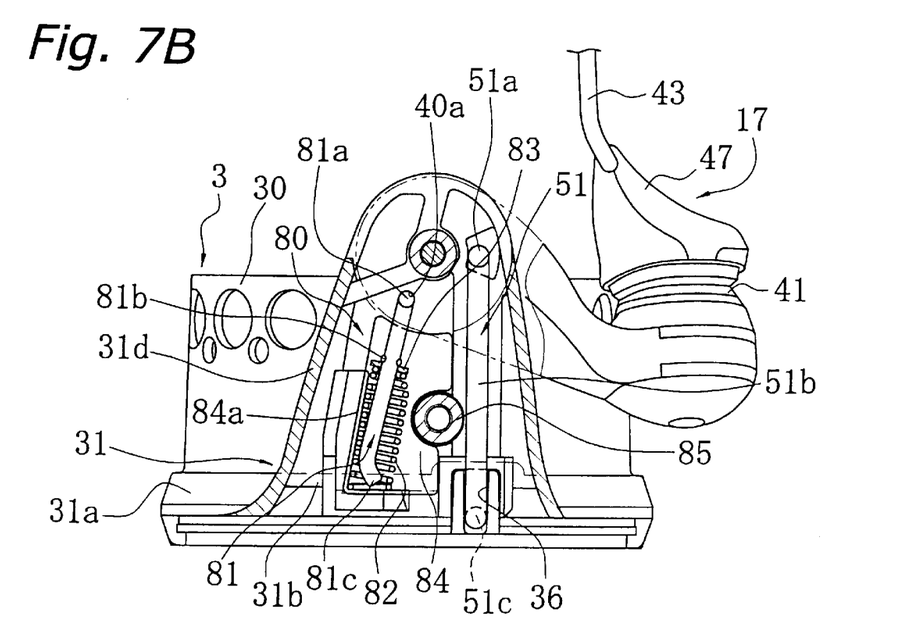

Other Embodiments (a) In the preceding embodiment, the toggle spring mechanism 50 was made of a rod 55, a guide member 56, and a coil spring 57, but as shown in FIG. 7, it is also possible to use a toggle spring mechanism 80 made of a rod 81 and a coil spring 82 arranged around the rod 81.

The rod 81 of this toggle spring mechanism 80 includes an interlocking portion 81a that is bent toward the first bail support member 40, such that its tip is interlocked with the engagement hole 40a of the first bail support member 40. The rod 81 also includes an lock-stop protrusion 81b at an intermediate position for lock-stopping the front end of the coil spring 82, as well as a bent portion 81c at its rear end, which is bent slightly. A washer 83 abutting against the front end of the coil spring 82 is provided at the lock-stop protrusion 81b, so that force is transmitted evenly from the front end portion of the coil spring 82 to the rod 81.

The coil spring 82 is guided by contact with a guiding sheet 84 made of a synthetic resin, such as nylon 66, disposed in the arm portion 31b. This guiding sheet 84 includes a wall portion 84a that is bent such that it guides and lock-stops the coil spring 82 unilaterally. The wall portion 84a has a height enabling it to contact the lateral portion and the base end of the coil spring 82. Thus, the coil spring 82 can be compressed easily, and the arm portion 31b is not damaged when compressing the coil spring 82.

The front end of the coil spring 82, which lock-stops on the washer 83, has a smaller winding diameter than the rest of the coil spring 82. Thus, except for the front end, a large gap is created between the coil spring 82 and the rod 81, and the coil spring 82 is not easily deformed when the rod 81 changes its position inside the coil spring 82. The arm 31b is provided with a boss portion 85 with a screw hole for mounting the first cover member 31c. Also in this bail tripping mechanism, provided with a toggle spring mechanism 80 with this configuration, the direction into which the first bail support member 40 is urged can be changed with the coil spring 82 during the pivoting, so that the same effect as in the previous embodiment can be attained.

In the embodiment thus, a cover portion may be provided covering the boss portion and the outer peripheral surface of the base end of the coil spring 82, contacting the inner peripheral surface of the base end, to lock-stop the base end of the coil spring 82. Furthermore, the boss portion and the cover portion may be attached to the arm portion 31b to pivot about an axis that is parallel to the pivot axis of the first bail support member 40. For example, an arcuate projection could be formed on the base-end surface of the boss portion and an arcuate recess into which the arcuate projection engages could be formed on the arm portion 31b, which would configure the boss portion to allow it to pivot.

(b) In the above-described embodiment, the braking member was made of synthetic rubber, but as long as it is elastic, it can also be made of metal, synthetic resin, wood (e.g. cork) or leather.

(c) In the above-described embodiment, the shifting member 51 is made of a metal filament, but the shifting member is not limited to this, and any configuration is suitable, as long as its rear end portion can shift back and forth and contact the braking surface of the braking member.

(d) In the above-described embodiment, the bail tripping mechanism 18 was disposed on the side of the first rotor arm 31, but it can also be disposed on the side of the second rotor arm 32. It is also possible to arrange a bail tripping mechanism 18 without the rotor braking mechanism 54 on one rotor arm, and the rotor braking mechanism 54 on the other rotor arm.

Figure 8:
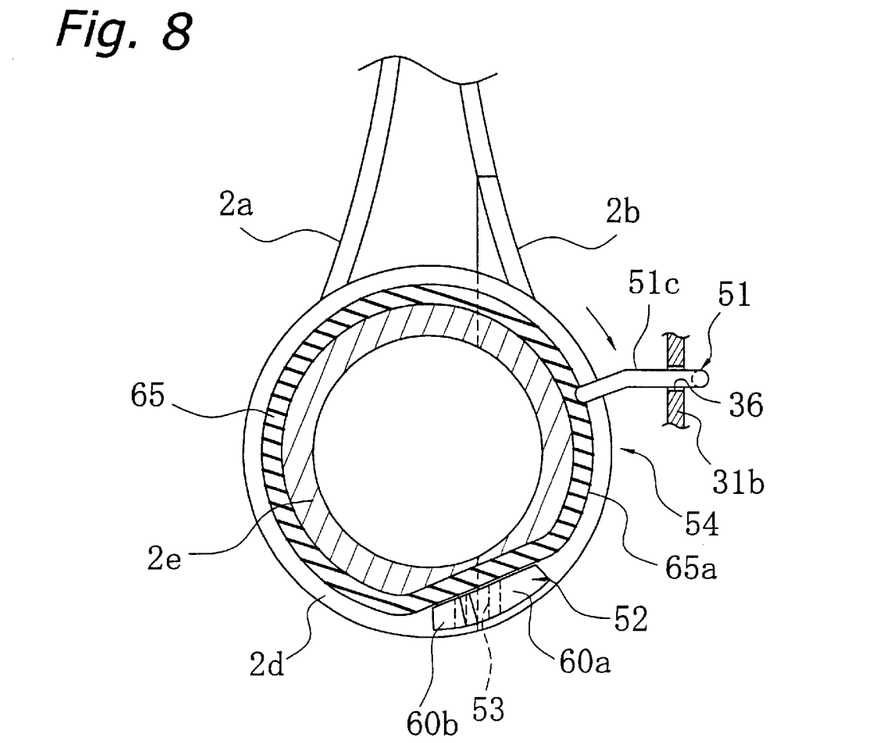
FIG. 8 is a view corresponding to FIG. 5, of another embodiment of the present invention.
Figure 9:
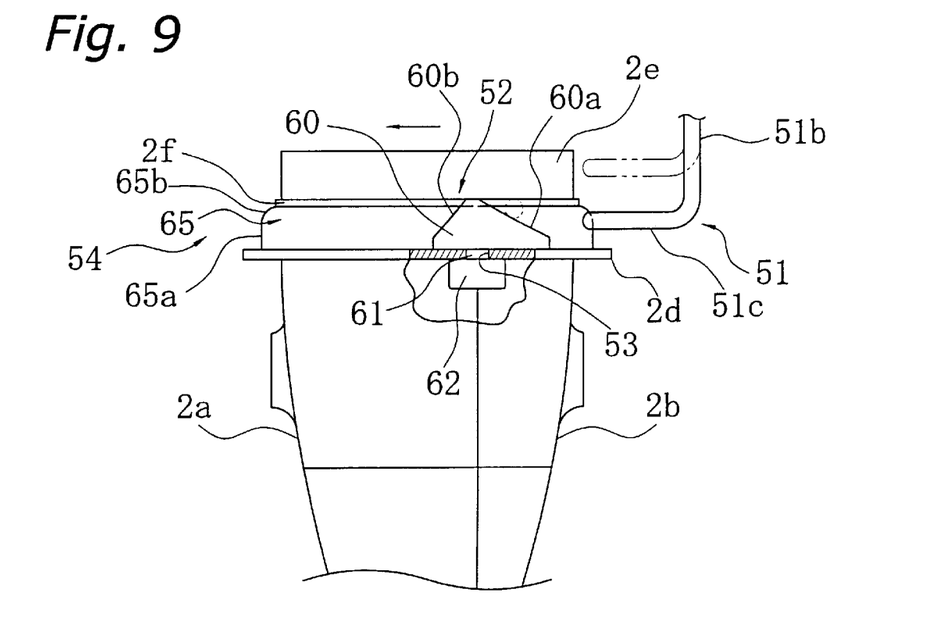
FIG. 9 is a view corresponding to FIG. 6, of another embodiment of the present invention.

(e) In the above-described embodiment, the incline surface 60a of the tripping wedge 52 is configured such that the leading side of the incline surface 60a (with respect to a rotation of the rotor 3 in the direction taking up fishing line) protrudes further towards the rotor 3 than the trailing side, but as shown in FIGS. 8 and 9, it is also possible to provide, in addition to the incline surface 60a, an oblique surface 60b, in which the leading side of the incline surface 60a (with respect to a rotation of the rotor 3 in the direction taking up fishing line) protrudes less towards the rotor 3 than the trailing side. Forming such an additional oblique surface 60b, the tripping wedge 52 is provided with two oblique surfaces arranged at an angle. As a result, when the rotor 3 is forced to rotate in reverse (i.e. the direction rolling off line) with the bail arm 17 in the line-releasing posture, and the shifting member 51 contacts the tripping wedge 52, the shifting member 51 of the bail tripping mechanism 18 is guided smoothly by the oblique surface 60b of the tripping wedge 52, and is less easily damaged. Such a tripping wedge 52 having two oblique surfaces 60a and 60b can be applied not only to a tripping wedge formed unitarily with the reel unit 2, but also to a bail tripping mechanism not having a braking member.

(f) In the above-described embodiment, the rear end portion 51c of the shifting member 51 is guided in horizontal direction by the slot 36, but it is also possible to arrange the slot 36 not in completely horizontal direction, but at an angle, so that the rear end portion 51c is guided diagonally. If the rear end portion 51c is guided diagonally, then in the line-releasing posture, the rear end portion 51c can be pointed toward the center of the rotor 3. If the rear end portion 51c points toward the center of the rotor 3, the rear end portion 51c does not have be bent further towards the center of the rotor 3.

(g) In the above-described embodiment, the tip of the rear end portion 51c of the shifting member 51 is rounded, but it is also possible to provide the rear end portion 51c with a bent tip contacting the braking surface 65 of the braking member 65.

(h) In the above-described embodiment, the tripping wedge 52 was disposed in an attachable/detachable manner on the flange 2d, but it can also be formed unitarily with the flange 2d.

(i) In the above-described embodiment, the conducting surface 65b was devised as a rounded surface, but it can also be devised as a tapered surface whose diameter decreases in frontward direction.

Figure 10:
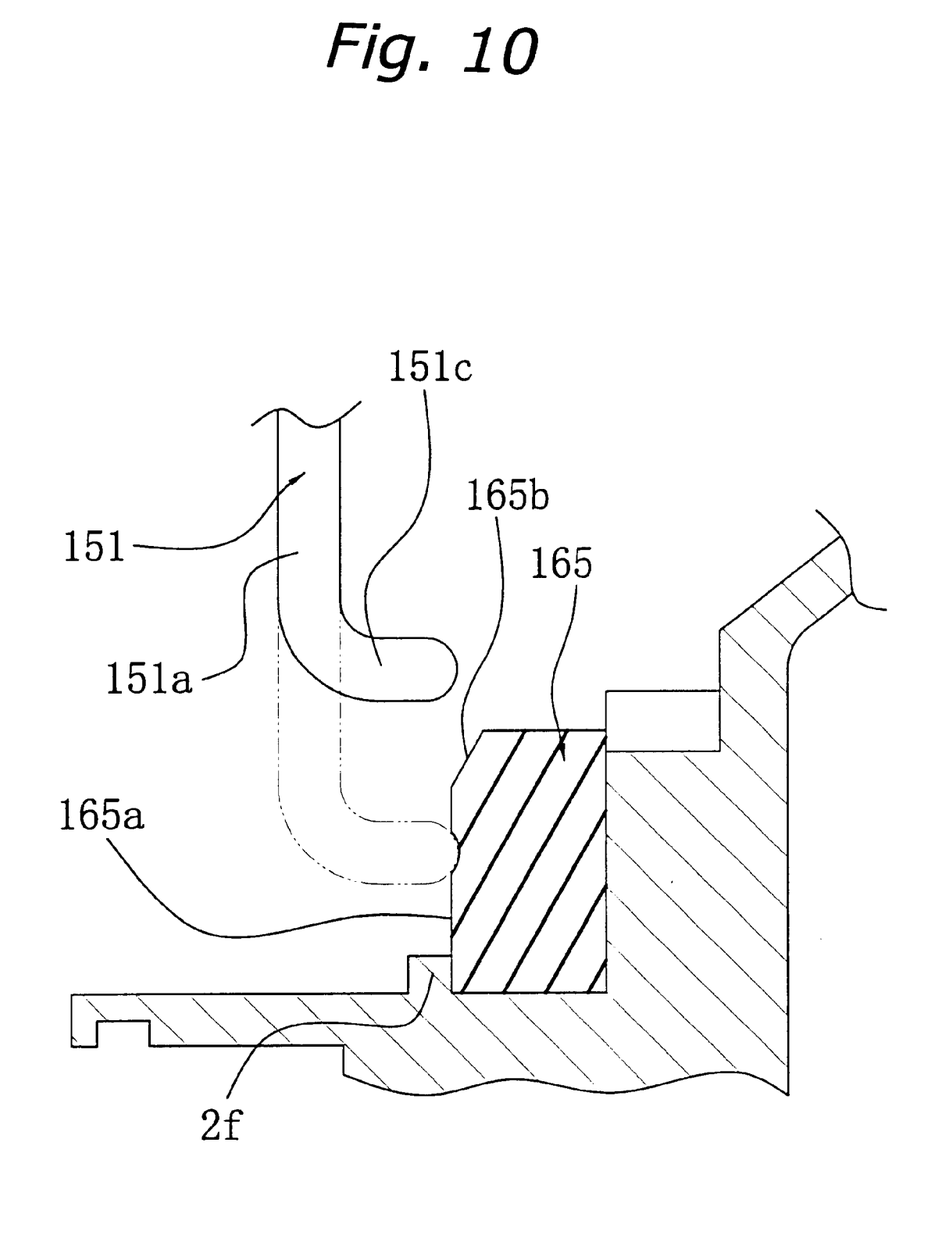
FIG. 10 is a view corresponding to FIG. 4, of another embodiment of the present invention.

(j) In the above-described embodiment, the shifting member 51 shifts back and forth, but as shown in FIG. 10, it is also possible to let a rear end portion 151c of the shifting member 151 shift in radial direction. In that case, the braking surface 165a of the braking member 165 is formed at the front end surface. The conducting surface 165b is not a rounded surface, but a tapered surface formed around the braking surface 165a, the diameter of the conducting surface 165b increasing towards the rear of the reel. In this configuration, the shifting member 151 is provided with a coupling portion (not shown in the drawings) that shifts depending on the pivoting of the bail arm 17 and a shifting portion 151a shifted in radial direction by the shifting of the coupling portion, and the rear end portion 151c of the shifting portion 151a is shifted in radial direction.

With the present invention, the side of the braking surface that faces the shifting member is receded further away from the shifting member than the side that is away from the shifting member, and the braking surface is formed substantially in parallel to the shifting direction of the shifting member, so that even when the shifting amount of the shifting member varies, the braking force stays the same, and the rotor can be braked reliably. Also, the shifting member contacts the braking surface from the side of the conducting surface that is formed such that the guiding member contacts the braking surface in a smooth manner.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A rotor braking device for braking the rotor fitted rotatively to the reel body of a spinning reel, in response to pivoting of the spinning-reel bail arm pivoting between a line-winding posture and a line-releasing posture, the spinning-reel rotor braking device comprising:

a shifting member fitted to the rotor to permit shifting toward the reel body from within the rotor in cooperation with the bail arm pivoting from the line-winding posture to the line-releasing posture; and an elastic braking member provided on the reel body, having
a braking surface formed to follow the shifting member shifting direction and contactable with the shifting member when the bail arm is in the line-releasing posture, said shifting member shifting in a direction that is substantially perpendicular to a direction in which said shifting member compresses said braking surface, and
a conducting surface provided continuous with said braking surface upstream-ward in the shifting member shifting direction and sloping such that its upstream side is distanced from the shifting member more than its downstream side.

2. The spinning reel rotor braking device as set forth in claim 1, wherein said braking member is made of an approximately rectangular in section elastic body formed substantially into an annulus on the front of the reel body, to be contactable with said shifting member.

3. A spinning reel rotor braking device for braking the rotor fitted rotatively to the reel body of a spinning reel, in response to pivoting of the spinning-reel bail arm pivoting between a line-winding posture and a line-releasing posture, the spinning-reel rotor braking device comprising:

a shifting member fitted to the rotor to permit shifting toward the reel body from within the rotor in cooperation with the bail arm pivoting from the line-winding posture to the line-releasing posture; and an elastic braking member provided on the reel body, having
a braking surface formed to follow the shifting member shifting direction and contactable with the shifting member when the bail arm is in the line-releasing posture, and
a conducting surface provided continuous with said braking surface upstream-ward in the shifting member shifting direction and sloping such that its upstream side is distanced from the shifting member more than its downstream side,
wherein:
said braking surface is formed into a flat circumferential face on the braking member surface outer peripherally, and said conducting surface is formed on the braking surface front into a sloping face gradually contracting diametrically heading reel-forward; and
a leading end of the shifting member is interlocked with the bail arm, and a trailing end of the shifting member is provided on the rotor to permit at least back-and-forth shifting in cooperation with pivoting of the bail arm, between a first position withdrawn from the reel body, corresponding to the line-winding posture, a second position adjacent the reel body and contacting said braking surface across said conducting surface, corresponding to the line-releasing posture.

4. The spinning reel rotor braking device as set forth in claim 3, wherein the conducting surface is formed into a conic-frustum shaped tapered face gradually contracting diametrically heading reel-forward.

5. The spinning reel rotor braking device as set forth in claim 3, wherein the conducting surface is formed into a rounded arch surface gradually contracting diametrically heading reel-forward.

6. The spinning reel rotor braking device as set forth in claim 3, wherein:

the shifting member leading end is bent toward the bail arm near its pivotal center so as to follow its pivotal axis, the trailing end is bent toward the rotor rotational axis, and in between is arranged substantially following the rotor rotational axis; and the trailing end is interlocked with the rotor to permit back-and-forth shifting, and the leading end is interlocked with an engagement recess formed in the bail arm to permit pivot-wise shifting.

7. The spinning reel rotor braking device as set forth in claim 6, wherein the engagement recess is an arcuate channel formed following the bail arm pivot-wise.

8. The spinning reel rotor braking device as set forth in claim 6, wherein the shifting member trailing-end surface contacting said braking surface is rounded.

9. The spinning reel rotor braking device as set forth in claim 3, further comprising:

a toggle spring mechanism whose leading end is interlocked rotatively with the bail arm, for toggle-urging the bail arm into the line-winding posture and the line-releasing posture; and a trip provided on the reel body front for, when the rotor is rotated line-winding-wise, contacting the trailing end protruding from the shifting member shifted into the second position, and shifting the shifting member toward the first position.

10. The spinning reel rotor braking device as set forth in claim 9, wherein the toggle spring mechanism has a front end that is interlocked rotatively with the bail arm at a position that is different from an interlocking position of the shifting member, the toggle spring mechanism toggles and biases the bail arm into the line-winding posture and the line-releasing posture, and the biasing direction changes depending on the pivoting of the bail arm.

11. The spinning reel rotor braking device as set forth in claim 9, wherein the toggle spring mechanism includes:

a shaft member one end of which is interlocked with the bail arm;

a guide member fitted to permit pivoting on the rotor, for guiding said shaft member to permit it to advance/retreat; and an urging member fitted on the guide member for urging said shaft member advancing-ward.

12. The spinning reel rotor braking device as set forth in claim 9, wherein the toggle spring mechanism includes:

a shaft member one end of which is interlocked with the bail arm; and an urging member guided in the rotor for urging on said shaft member, the one end and the other end of which are lock-stopped respectively on said shaft member and on the rotor.

13. The spinning reel rotor braking device as set forth in claim 12, wherein said urging member is a coil spring disposed peripherally about said shaft member, one end of said coil spring that is lock-stopped on said shaft member is smaller in coil diameter than the rest of said coil spring.

14. The spinning reel rotor braking device as set forth in claim 12, further comprising a sheet member made of a synthetic resin, disposed between said urging member and the rotor for guiding said urging member.

15. The spinning reel rotor braking device as set forth in claim 9, wherein said braking member is D-shaped, radially inwardly skirting where said trip is provided.

16. The spinning reel rotor braking device as set forth in claim 9, wherein said trip has a first incline surface whose downstream side in the rotor line-winding rotational direction protrudes from the reel body front towards the rotor more than its upstream side.

17. The spinning reel rotor braking device as set forth in claim 16, wherein said trip further has a second incline surface formed continuous with the protruding portion of the first incline surface and diminishing in protrusion amount heading from the protruding portion of the first incline surface toward the downstream side in the rotor line-winding rotational direction.

18. The spinning reel rotor braking device as set forth in claim 17, wherein at least a portion of the incline surfaces of said trip protrudes further toward the rotor than the shifting member contacting portion of said braking member.

19. A spinning reel rotor braking device for braking the rotor fitted rotatively to the reel body of a spinning reel, in response to pivoting of the spinning-reel bail arm pivoting between a line-winding posture and a line-releasing posture, the spinning-reel rotor braking device comprising:

a shifting member fitted to the rotor to permit shifting toward the reel body from within the rotor in cooperation with the bail arm pivoting from the line-winding posture to the line-releasing posture; and an elastic braking member provided on the reel body, having a braking surface formed to follow the shifting member shifting direction and contactable with the shifting member when the bail arm is in the line-releasing posture, and a conducting surface provided continuous with said braking surface upstream-ward in the shifting member shifting direction and sloping such that its upstream side is distanced from the shifting member more than its downstream side, wherein:

said braking surface is formed into a flat annular surface on the braking member front-end face, and said conducting surface is formed circumferentially on the braking surface front into a sloping face gradually enlarging diametrically heading reel-rearward; and the shifting member includes a cooperating portion whose leading end is interlocked with the bail arm, fitted to permit shifting in cooperation with pivoting of the bail arm, in between a first position withdrawn from the reel body, corresponding to the line-winding posture, a second position adjacent the reel body, corresponding to the line-releasing posture; and a shifting portion provided on the rotor so as to shift radially in cooperation with said cooperating portion shifting between the first position and the second position, for contacting said braking surface across said conducting surface when said cooperating portion shifts from the first position to the second position.

* * * * *